(12) United States Patent
Kumar

(10) Patent No.: US 10,102,206 B2
(45) Date of Patent: Oct. 16, 2018

(54) INTELLIGENTLY IDENTIFYING AND PRESENTING DIGITAL DOCUMENTS

(71) Applicant: DROPBOX, INC., San Francisco, CA (US)

(72) Inventor: Neeraj Kumar, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 166 days.

(21) Appl. No.: 15/086,912

(22) Filed: Mar. 31, 2016

(65) Prior Publication Data

US 2017/0286415 A1    Oct. 5, 2017

(51) Int. Cl.
*G06K 9/00* (2006.01)
*G06F 17/30* (2006.01)

(52) U.S. Cl.
CPC .. *G06F 17/30011* (2013.01); *G06F 17/30047* (2013.01); *G06K 9/00456* (2013.01)

(58) Field of Classification Search
CPC ............... G06F 17/30244–17/30277; G06K 9/00442–9/00483; G06T 2207/30176
See application file for complete search history.

(56) References Cited

U.S. PATENT DOCUMENTS

| | | | |
|---|---|---|---|
| 5,038,392 A | 8/1991 | Morris et al. | |
| 6,249,226 B1 | 6/2001 | Harrison et al. | |
| 6,272,245 B1 * | 8/2001 | Lin | G06K 9/00463 382/135 |
| 7,479,950 B2 | 1/2009 | Dehlin et al. | |
| 8,036,497 B2 | 10/2011 | Kise et al. | |
| 8,286,083 B2 | 10/2012 | Barrus et al. | |
| 8,451,473 B2 | 5/2013 | Hong et al. | |
| 8,489,583 B2 | 7/2013 | Phillips et al. | |

(Continued)

FOREIGN PATENT DOCUMENTS

WO    WO 2017-172637    10/2017

OTHER PUBLICATIONS

Qiong Liu, Paul McEvoy, Don Kimber, Patrick Chiu, Hanning Zhou; "On Redirecting Documents With a Mobile Camera"; pp. 467-470; Published in: 2006 IEEE Workshop on Multimedia Signal Processing; Conference date: Oct. 3-6, 2006; FX Palo Alto Laboratory, 3400 Hillview Ave. Bldg. 4, Palo Alto, CA, U.S.A.

(Continued)

*Primary Examiner* — Wesley J Tucker
(74) *Attorney, Agent, or Firm* — Keller Jolley Preece

(57) ABSTRACT

One or more embodiments of a document organization system quickly and conveniently provide digital documents to a user on a client device based on a physical object. In particular, the document organization system can receive an image of a physical document and an identifier from a first client device, identify digital documents that match the physical document, and provide the matching digital documents to a second client device, which displays the identifier. In another embodiment, the document organization system allows a user to bind digital documents to a physical object and later recall the digital documents using the physical object. In addition, the document organization system can store and recall the layout arrangement of digital documents on a client device when binding and recalling the digital documents to the physical object.

20 Claims, 10 Drawing Sheets

(56) References Cited

U.S. PATENT DOCUMENTS

| | | | |
|---|---|---|---|
| 8,941,560 B2 | 1/2015 | Wong et al. | |
| 9,219,762 B2 | 12/2015 | Burch et al. | |
| 9,342,741 B2* | 5/2016 | Amtrup | G06K 9/00469 |
| 2005/0234851 A1* | 10/2005 | King | H04N 1/00244 |
| 2008/0240618 A1* | 10/2008 | Chen | G06K 9/00456 |
| | | | 382/305 |
| 2011/0035662 A1* | 2/2011 | King | G06F 17/211 |
| | | | 715/273 |
| 2012/0328215 A1 | 12/2012 | Thong et al. | |
| 2015/0082410 A1 | 3/2015 | Fitzgerald et al. | |
| 2017/0270122 A1* | 9/2017 | He | G06F 17/30554 |
| 2017/0351915 A1* | 12/2017 | Thompson | G06F 17/30371 |

OTHER PUBLICATIONS

International Search Report and Written Opinion as received in PCT/US2017/024353 dated Aug. 22, 2017.
Partial International Search Report as received in PCT/US2017/024353 dated Jun. 28, 2017.

\* cited by examiner

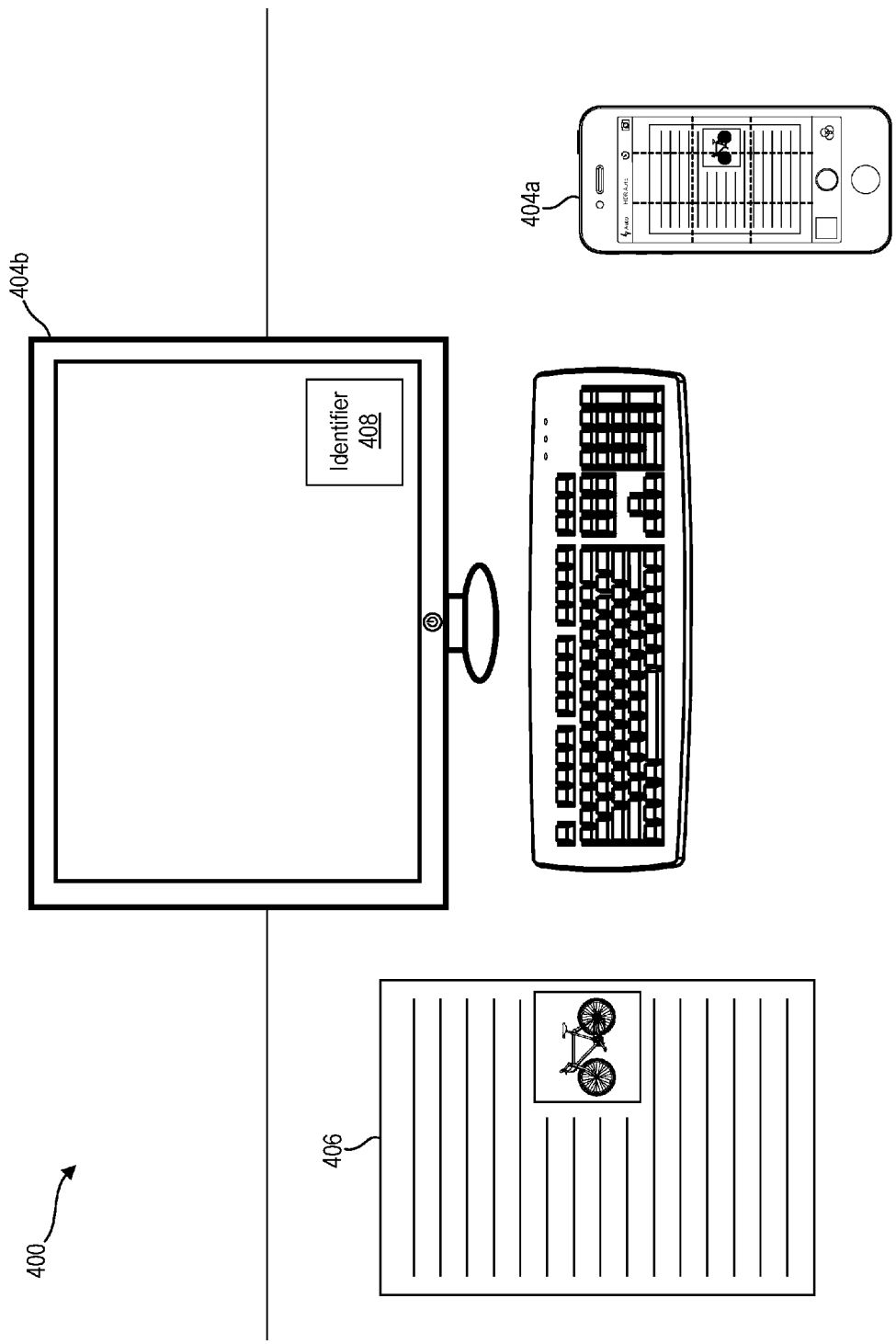

INTELLIGENTLY IDENTIFYING AND PRESENTING DIGITAL DOCUMENTS

BACKGROUND

Many users interact with both digital and physical documents on a daily basis. In many instances, however, as computers improve and technology advances, users are shifting away from physical space to digital space. For example, photographers almost exclusively work in digital space when capturing and editing pictures. As another example, many offices are going "paperless" by eliminating the need to store paper copies of files. Indeed, working with digital documents provides users with a convenience, collaboration, and accessibility not provided by physical documents. As part of the transition from physical space to digital space, however, certain disadvantages have arisen.

To illustrate, the human mind excels at understanding spatial connections in the physical world, especially connections that are visually apparent. For example, a user who has various stacks of files and folders in his or her office, when asked for the location of a particular file, can quickly and accurately locate the exact location of the file. The same user, however, may struggle to locate a digital copy of the file in the digital realm. As such, the user may resort to external sources for help, such as a search function on a computer, which can often be slow and unreliable.

As another example, a user may be working with a number of digital documents on a computing device, for example, as part of a work project. If the user needs to switch to another project, the user often closes the documents from the first project and opens the documents for the other project. Upon switching back to the first project, the user must re-locate, re-open, and often re-arrange the documents from the first project on one or more display devices. Accordingly, the user is often much more efficient at storing, locating, and retrieving documents in the physical realm.

Accordingly, there are a number of considerations to be made in document management and organization when working with digital documents.

SUMMARY

Embodiments of the present disclosure provide benefits and/or solve one or more of the foregoing or other problems in the art with systems and methods for document management and organization when working with digital documents. For example, one or more embodiments include systems and methods for providing document matching and retrieval based on an image of a physical document captured by a user using a client device. For instance, a user may capture an image of a paper document, and the systems and methods disclosed herein can provide the user with a digital copy of the document and/or other similar documents. Furthermore, the resulting documents can be intelligently provided to the client by way of a client device and/or digital workspace based on another image captured by the user that is tied to the target device/workspace.

To briefly illustrate, a document management system can provide an identifier (e.g., a unique image, a unique QR code) for display to a user on a client device. The system can tie the identifier to the client device and/or a digital workspace presented on the client device. A user, wanting to locate a digital copy of a physical document (e.g., a paper document, a printed photograph, etc.), uses a second client device, such as a mobile device, to capture an image of the physical document and capture an image of the identifier. Using the image of the physical document, the document management system can search for related digital documents, potentially including an exact digital match of the physical document. Further, using the image of the identifier, the document management system can provide the results of the digital document search to the client device tied to the identifier (e.g., the system can provide the search results for presentation in a user interface, such as a digital workspace, displayed on the client device).

In additional embodiments of the present disclosure, a document management system can bind digital documents to physical objects. For example, a user can identify one or more digital documents and provide an image of a physical object to be bound to the identified digital documents. When the user wants to later access the set of documents, the user provides an image of the physical object (e.g., an image of the physical object captured using a mobile device). In response, the document management system uses the image of the physical object to identify and provide the bound set of documents to the user. In addition, the document management system can save a layout/arrangement of the digital documents when bound to the physical object, and then provide the digital documents in the saved layout/arrangement when later provided to the user.

Accordingly, the disclosed systems and methods allow users to benefit from creating synergies between physical space and digital space. For example, the disclosed systems and methods leverage connections between physical and digital objects to facilitate intuitive interactions by the user with physical objects to perform actions within a digital workspace. In other words, the systems and methods can bring the advantages of working with physical objects to digital documents.

Additional features and advantages of the present disclosure will be set forth in the description that follows, and in part will be obvious from the description, or may be learned by the practice of such exemplary embodiments. The features and advantages of such embodiments may be realized and obtained by way of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered limiting of its scope, the present disclosure will be described and explained with additional specificity and detail using the accompanying drawings.

FIGS. 4A-4B illustrate an example workspace environment where document matching can occur in accordance with one or more embodiments described herein;

DETAILED DESCRIPTION

Figure 1:
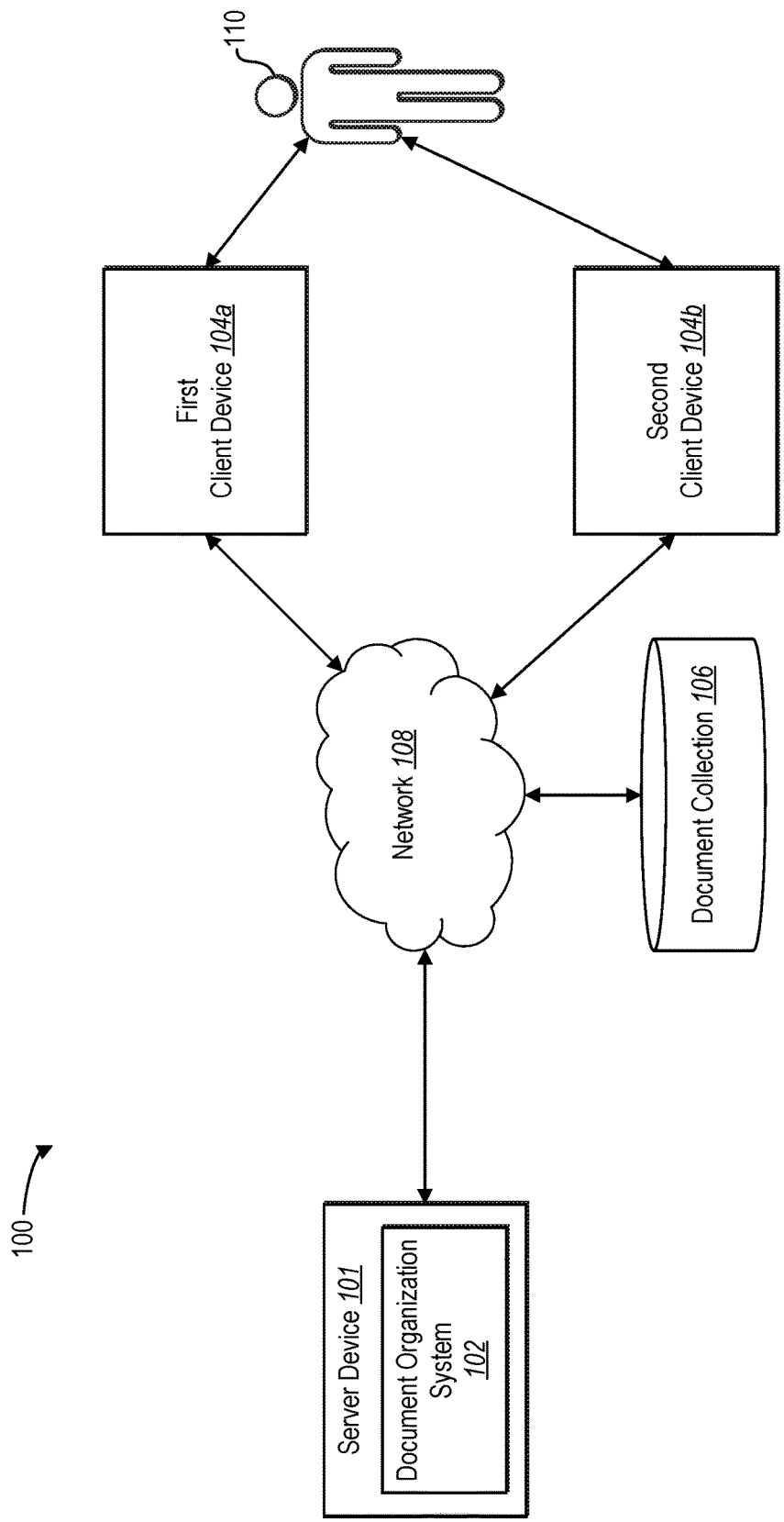
FIG. 1 illustrates a schematic diagram of a communication environment in accordance with one or more embodiments described herein.

The present disclosure provides one or more embodiments of a document organization system that intelligently identifies and provides documents to a user. As one example, a document management system can provide a user with digital documents based on an image of a paper document captured by the user (e.g., using a mobile device). For example, a user scans a picture of a paper copy of a document, and the document organization system provides the user with a digital copy of the document and/or other related documents. The document organization system can further provide the user with the resulting digital documents at a particular client device and/or within a particular digital workspace based on an image of a unique identifier received from the user. In another example, a user provides the document organization system with an image of a physical object and the document organization system provides the user with a set of digital documents previously associated with the physical object.

As mentioned above, in some embodiments, the document organization system provides digital matches of physical documents intelligently on a particular client device and/or digital workspace. In particular, the document organization system provides an identifier to a user on a first client device (e.g., causes the first client device to display the identifier). With a second client device, the user captures an image of a physical document of interest (e.g., a printed document, a printed image, etc.) as well as an image of the provided identifier. Using the image of the physical document, the document organization system identifies a digital copy of the physical document and/or other digital documents that are similar to the physical document (e.g., documents that include text, an image, or other content matching or similar to content included in the physical document). The document organization system then utilizes the image of the identifier to determine a location (e.g., a client device and/or digital workspace) where the resulting digital documents should be provided. In particular, in this example, the document organization system utilizes the identifier to associate the resulting digital documents with and provide the resulting digital documents to the first client device and/or cause the first client device to display the resulting digital documents.

As further mentioned above, the document organization system allows a user to bind digital documents to a physical object. For example, a user can associate one or more digital documents with a physical object, such as a coffee mug, a pen, a book cover, a sticky note, or any other physical object. In particular, the user provides an image of the physical object and an indication of which digital documents to bind, and the document organization system associates the documents with the physical object in the image. Subsequently, when the user provides an image of the physical object (e.g., in a stored image or live stream) to the document organization system, the document organization system can provide the bound documents to the user. In addition, the document organization system can preserve an arrangement of the bound documents as displayed when bound to the physical object. For instance, if a user has the documents opened and arranged on the display of a desktop client device, the user can request that the document organization system also store the arrangement of the digital documents. When the user later wants to access the set of documents, the document organization system provides the digital documents for display on the desktop client device in the stored arrangement.

As mentioned above, the disclosed document organization system and corresponding processes provide users with a number of advantages. As one advantage, the document organization system allows a user to easily find digital copies of physical documents. As another advantage, the user can spatially associate various projects or assignments, each having an associated set of documents, with different physical objects. Then, using the spatial connection, the user can easily recall and access various sets of digital documents using the corresponding physical objects.

As used herein, the term "digital document" refers to any digital version of an electronic document also capable of being printed or reproduced in physical form. For example, a digital document can be a digital document file having one of a variety of file formats, such as file formats associated with word processor, spreadsheet, communications, and/or graphics software applications. Examples of digital document include, but are not limited to, HTML files, WORD files, pdf files, slideshow presentation files, electronic messages, emails, instant messages, digital images files, etc. Further, digital documents can include content from one or more additional digital documents. For example, a word processing document can include a digital image (e.g., a full resolution image).

Additional features and characteristics of one or more embodiments of a document organization system are described below with respect to the Figures. FIG. 1 illustrates an example embodiment of communication system 100 (or simply, "system 100") in accordance with one or more embodiments described herein. As shown, system 100 includes server device 101 comprising document organization system 102, first client device 104a, second client device 104b (collectively referred to as "client devices 104"), and document collection 106, that communicate through network 108. Although FIG. 1 illustrates a particular arrangement of document organization system 102, client devices 104, document storage 106, and network 108, various additional arrangements are possible. For example, document organization system 102 may directly communicate with document collection 106, bypassing network 108.

The components of system 100, including server device 101, client devices 104, and document collection 106 can communicate via network 108. Network 108 may include one or more networks and may use one or more communication platforms or technologies suitable for transmitting data and/or communication signals. Additional details relating to network 108 are explained below with reference to FIGS. 8 and 9.

Document collection 106 comprises one or more storage devices storing digital documents or digital copies of documents. The digital documents stored on document collection 106 can be associated with one of more users, such as user 110. For example, document collection 106 can store one or more documents in a user account belonging to user 110. Additionally, rather than being tied to one or more users, document collection 106 can store digital documents openly available to all users.

As further illustrated in FIG. 1, user 110 may interact with client devices 104. User 110 may be an individual (i.e., human user), a business, a group, or any other entity. For purposes of explanation, FIG. 1 illustrates only one user, however, it should be understood that system 100 may include any number of users interacting with system 100 using one or more corresponding client devices.

Client devices 104 may represent various types of client devices. For example, client devices 104 can include a mobile device, such as a smartwatch or other wearable device, a mobile telephone, a smartphone, a PDA, a tablet, a laptop, or another portable device with a camera and/or display. For instance, a user can use a camera on her wearable device to capture an image and use a virtual-reality device to display document results. Furthermore, client devices 104 can include a non-mobile device, such as a desktop or server. For instance, first client device 104*a* may be a mobile client device and second client device 104*b* may be a non-mobile client device. In addition, client devices 104 may include display devices such as televisions, LCD displays, LED displays, monitors, projectors, etc. Generally, as used herein, the term "client device" can include any type of computing device. Additional details and examples with respect to client devices 104 are discussed below with respect to FIG. 8.

In general, client devices 104 enable user 110 to interact with document organization system 102. According to one example embodiment, user 110 uses first client device to capture an image of a physical document and an image of an identifier (displayed, for example, on second client device 104*b*). User 110 provides the captured images to document organization system 102. Alternatively, the first client device processes the image and sends metadata of the image (e.g., feature vector information) to one or more servers of document organization system 102. In response, document organization system 102 uses the image of the physical document to identify a digital copy of the document and/or any other related digital documents (e.g., from documents stored by document collection 106). Document organization system 102 then provides the identified documents to user 110 via second client device 104*b*. Additional examples of user interactions with document organization system 102 are provided below.

Figure 2:
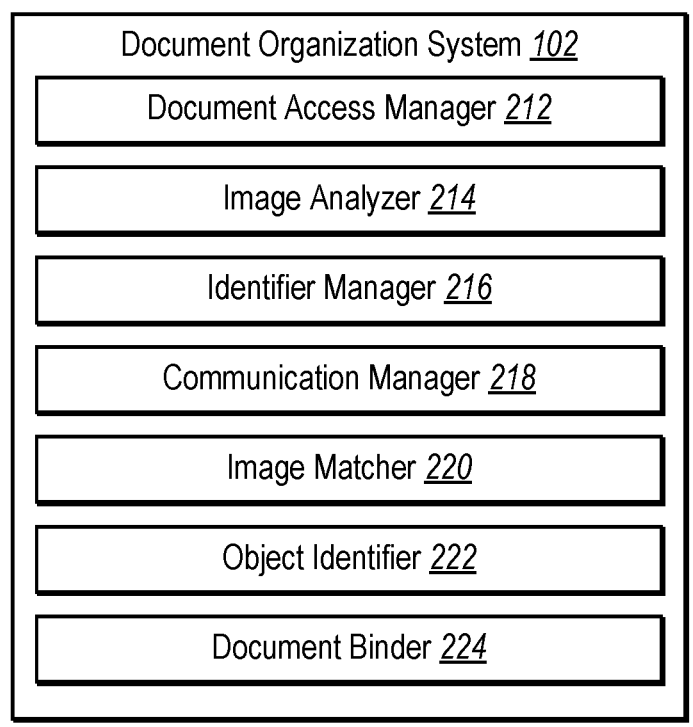
FIG. 2 illustrates a schematic diagram of a document organization system in accordance with one or more embodiments described herein.

FIG. 2 illustrates an example embodiment of document organization system 102. As shown, document organization system 102 may include, but is not limited to, document access manager 212, image analyzer 214, identifier manager 216, communication manager 218, image matcher 220, object identifier 222, and document binder 224. Each of components 212-224 of document organization system 102 may be in communication with one another using any suitable communication technologies. In addition, although components of document organization system 102 are shown separately in FIG. 1, any of components of document organization system 102 may be combined into fewer components, such as into a single component, or divided into more components as may serve a particular embodiment. Further, components of document organization system 102 may be located on, or implemented by, one or more computing devices, such as one or more server devices.

Each of components of document organization system 102 can comprise software, hardware, or both. For example, each of components of document organization system 102 can comprise one or more instructions stored on a computer-readable storage medium and executable by one or more processors of one or more computing devices. When executed by the one or more processors, the computer-executable instructions cause a computing device to perform the methods described herein. Alternatively, components of document organization system 102 can comprise hardware, such as a special purpose processing device to perform a certain function or group of functions.

As an overview, in one or more embodiments, document organization system 102 intelligently identifies and provides digital documents to users based on images captured by the users, as introduced in more detail above.

As mentioned above, the illustrated example of document organization system 102 includes document access manager 212. Document access manager 212 can identify and access various digital documents. For instance, document access manager 212 accesses digital documents stored in document collection 106 described above with respect to FIG. 1. In one or more embodiments, document access manager 212 accesses digital documents associated with a user, such as files uploaded by a user to document collection 106. Alternatively, document access manager 212 accesses digital documents otherwise available, such as documents uploaded by the user's organization (e.g., provided by co-workers, colleagues, etc.), uploaded by other users, and/or made available via the Internet (e.g., state or federal tax forms, public images, etc.).

In addition, document access manager 212 can classify types of digital documents. For a document classified as a non-image document, document access manager 212 can create one or more images of the document. For example, if document access manager 212 identifies a portable document file (PDF) that is ten pages in length, for each page of the PDF, document access manager 212 can create an image of the page. Document access manager 212 then associates the PDF page images with the PDF. If a non-image document is only a single page, document access manager 212 will generally only create a single image for the document.

In connection with document access manager 212 identifying and accessing digital documents, document organization system 102 includes image analyzer 214. In general, image analyzer 214 processes digital documents accessed by document access manager 212. More specifically, image analyzer 214 analyzes images (e.g., documents classified as images or images of non-image documents) to determine feature vectors in each image. In particular, image analyzer 214 can uses a deep neural network to compute feature vectors for each image, as further described below.

As mentioned above, document access manager 212 creates an image for each page of each non-image document. Thus, for a multiple page document, image analyzer 214 will analyze multiple images and determine feature vectors for each image page of the document. Regardless of the number of images associated with a digital document, image analyzer 214 can store the determined feature vectors for each image of the digital document for later comparison and use, as described in further detail below. Furthermore, in some embodiments, document access manager 212 can identify, analyze, and store feature vectors for portions of a document page. For example, document access manager 212 parses an image page to identify text and non-text sections and/or features (e.g., figures, graphs, logos, etc.) of the document. Document access manager 212 can store feature vectors for each identified portion and feature of the image page. In this manner, if multiple documents share a common image (or feature), document access manager 212 can isolate that image (or feature) and store the same of similar feature vectors for each of the digital documents.

Document organization system 102 also includes identifier manager 216. Identifier manager 216 provides an identifier to a client device. For example, an identifier can be a barcode, a quick response (QR) code, an image, a sequence of letters and/or numbers, or another other type of unique identifier. The identifier manager 216 tracks which identifier is provided to which client device (or user). In this manner, when the identifier manager 216 receives the identifier or an image of the identifier from a user, identifier manager 216 can quickly identify to which client device (or user) the identifier corresponds.

In some embodiments, identifier manager 216 updates and/or refreshes an identifier based on a time period. For example, identifier manager 216 may refresh the identifier sent to a client device each hour, day, week, etc. For instance, upon identifier manager 216 detects that a client device was sent an identifier 24-hours ago, identifier manager 216 can resend or push a new identifier to the client device. Additionally, identifier manager 216 can update the identifier based on a user request, the detection of a duplicate identifier, on another type of trigger. Alternatively, in some embodiments, identifier manager 216 can associate a client device with a specific identifier (e.g., maintain a database linking client devices to identifiers), and when the client device requests an identifier, identifier manager 216 sends the corresponding identifier to the client device.

Communication manager 218 manages communication between a user and document organization system 102. For example, when a user sends an image of a physical document from a client device associated with the user to document organization system 102, communication manager 218 receives the image and provides the image to image analyzer 214 and/or image matcher 220.

In addition, communication manager 218 provides digital documents, results, and other communications to a user. For example, upon document access manager 212 identifying a matching digital document or relevant digital documents, communication manager 218 can provide the results to the user via a client device associated with the user (as identified by the identifier). Communication manager 218 can also facilitate other communications between a user and document organization system 102, as described below.

As mentioned above, document organization system 102 can identify matching document or relevant digital documents. In particular and as shown in FIG. 2, document organization system 102 includes image matcher 220. Image matcher 220 can identify if a digital document matches or is relevant to an image provided by a user. In addition, image matcher 220 can work in conjunction with image analyzer 214 and/or other components of document organization system 102.

In one or more embodiments, image matcher 220 compares feature vectors from a received image to stored feature vectors for document collection 106. For example, if a user captures an image of a paper document, image matcher 220 can compare feature vectors of the captured image to stored feature vectors to determine a matching digital document. In a similar manner, image matcher 220 can determine if a captured image matches other relevant documents in a document collection. Additional detail is provided below regarding comparing and matching images.

Similar to matching images, document organization system 102 can identify objects in a captured image. In particular, object identifier 222 can determine if a captured image includes an object, and if the object is previously associated with one or more documents in a document collection. For example, object identifier 222 can work in connection with image analyzer 214 to determine feature vectors for a captured image and image matcher 220 to determine if the object matches a previously received image of the object or images of objects similar to the object. Further, when object identifier 222 identifies an object, object identifier 222 can work with document binder 224 to bind the object to one or more digital documents or retrieve one or more bound documents.

As mentioned, document binder 224 facilitates binding digital documents to physical objects or an image of a physical object. In general, document binder 224 binds one or more digital documents to a physical object by associating the one or more digital documents with an image of the physical object. To illustrate, a user requests to bind or re-bind a set of digital documents with a physical object. In particular, the user can capture an image of the physical object and identify the digital document(s) to be bound to the physical document, in response to which, document binder 224 binds the identified digital document(s) to the physical object found within the captured image.

Subsequently, the user may request to access the bound digital documents. In this case, the user provides an image of the physical object to document binder 224, and document binder 224 identifies which digital documents are currently bound to the physical object. Upon identifying the bound digital documents, document binder 224 can, via communication manager 218, provide the bound digital documents to the user. Thus, document binder 224 can quickly recall bound documents upon receiving an indication of a physical object (e.g., from object identifier 222) and upon identifying which digital documents are bound to the physical object.

In some embodiments, document binder 224 also binds a client device and/or layout arrangement to a physical object. For example, document binder 224 may bind a preference or setting that indicates a particular arrangement of the bound digital documents so long as the receiving client device is able to accommodate the layout. Additionally, and/or alternatively, document binder 224 may bind a preference or setting that provides the bound digital documents to a particular client device, unless otherwise specified by the user. Overall, one will appreciate that document binder 224 can bind, attach, or otherwise associate additional preferences and/or settings to a physical object and later recall as well as apply the additional preferences and/or settings as described above.

Figure 3:
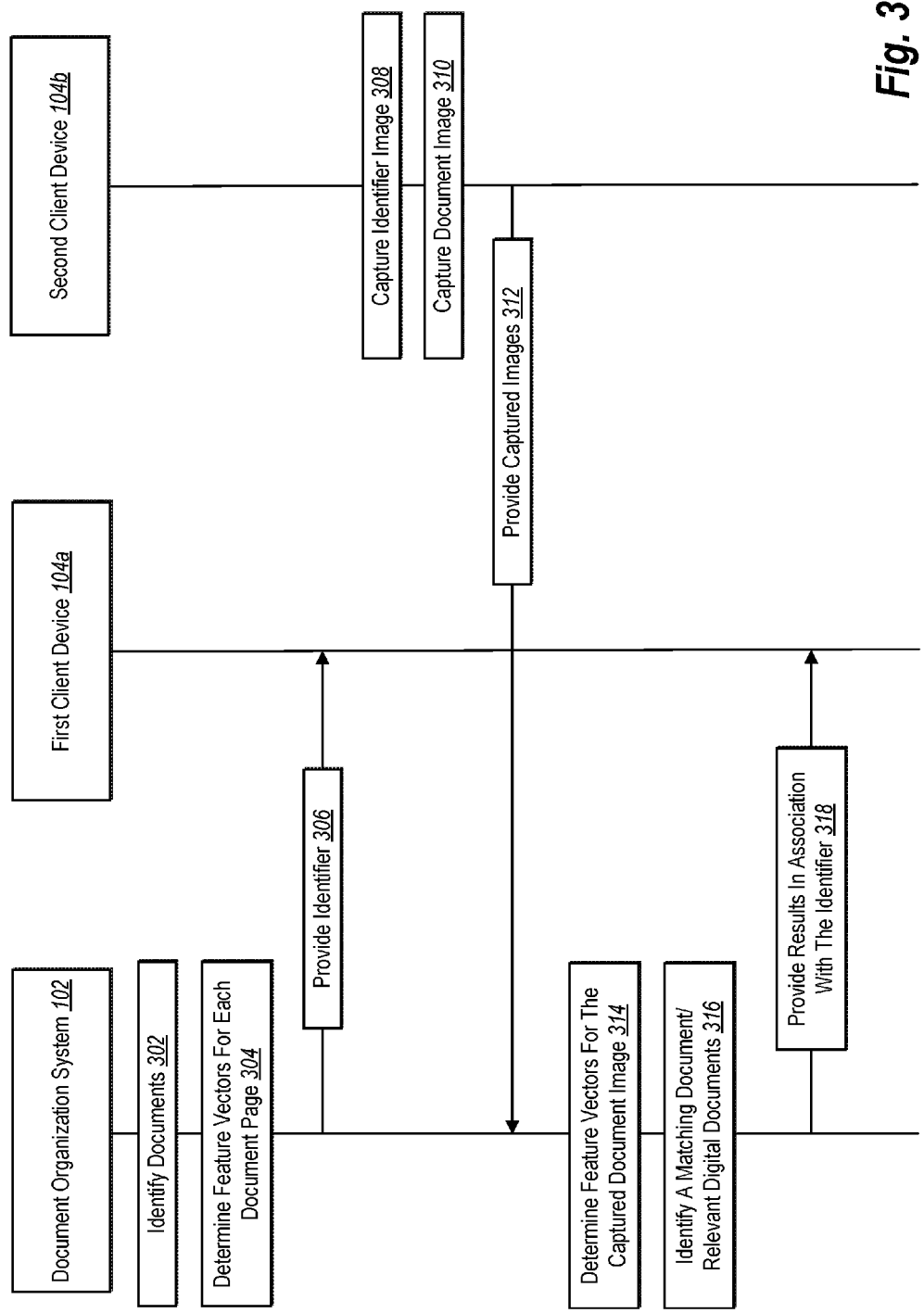
FIG. 3 illustrates a method-flow diagram showing document organization system interacting with a first client device and a second client device to identify and provide digital documents in accordance with one or more embodiments described herein.

FIG. 3 includes a diagram illustrating an example method flow of document organization system 102 interacting with first client device 104a and second client device 104b to identify digital document matches in accordance with one or more embodiments. Document organization system 102, first client device 104a, and second client device 104b in FIG. 3 can be example embodiments of corresponding components described in connection with FIG. 1. In addition, the same user can operate first client device 104a and second client device 104b. For example, in one embodiment, first client device 104a is a desktop computer and second client device 104b is a mobile device, both associated with the same user.

As shown in step 302 of FIG. 3, document organization system 102 identifies documents. For example, document organization system 102 identifies digital documents in a document collection associated with a user or a group of users. Further, in addition to identifying the documents, document organization system 102 also accesses the digital documents. For instance, document organization system 102 identifies and accesses digital documents from a user's document collection.

In step 304, document organization system 102 determines feature vectors for each document page. As a note, in pattern recognition and machine learning, a feature vector is an n-dimensional vector of numerical features that represent an object. Further, in some embodiments, when representing images, the feature vectors might correspond to the pixels of an image and when representing texts, the feature vectors might correspond to term occurrence frequencies. In one or more embodiments, the feature vectors might correspond to high-level features that capture metadata about an image, such as determining that an image looks like a particular person, object, scene, or other label (e.g., "sunset," "office desk," "family," "President Lincoln," etc.).

Document organization system 102 can compute feature vectors for images of digital documents in the accessed collection of documents. For digital documents that are images, document organization system 102 can compute feature vectors for the images. For digital documents that are not images, document organization system 102 can convert the documents into one or more images. For example, document organization system 102 can convert each page of a multi-page document into a document page image, before calculating feature vectors for each document page image.

In one or more embodiments, document organization system 102 can employ machine learning via a neural network or a deep neural network to determine feature vectors for each image. More specifically, rather than using machine learning to identify the category to which an image belongs, document organization system 102 ends the machine learning process one or more iterations before completion. By ending the machine learning process one or more stages early, the document organization system can represent an image using a set of numbers. For example, in some deep neural networks, the deep neural network represents an image at the next-to-last stage with roughly 5,000 numbers (or 5,000 dimensions). Document organization system 102 stores these number (or dimensions) as feature vectors to numerically represent an image. As described below, document organization system 102 can compare the feature vectors from multiple images to determine matches.

In step 306, document organization system 102 provides first client device 104a with an identifier. For example, document organization system 102 sends a unique image, QR code, or other identifier to first client device 104a. Document organization system 102 can provide the identifier via an application, web browser, electronic message, or in another form of communication. In some embodiments, document organization system 102 sends the identifier in response to a corresponding request from first client device 104a, indicating that a user is interested in receiving document search results at first client device 104a. In one or more embodiments, first client device 104a displays the received identifier within an application and/or digital workspace running/open on first client device 104a.

A user captures an image of the identifier on first client device 104a using second client device 104b, as shown in step 308. For example, if first client device 104a is a desktop computer and second client device 104b is a mobile device with a camera, a user can use the camera on second client device 104b to capture an image of the identifier displayed on a display device of first client device 104a. As examples, the user can capture a still image of the identifier with second client device 104b or just use the camera on second client device 104b to live-scan the identifier.

As shown in step 310, the user captures an image of a physical document using second client device 104b. For example, the user can use a camera of second client device to capture an image of a page of a paper document. As a note, steps 308 and 310 can be performed interchangeably. For instance, a user may first capture an image of the physical document before capturing the image of the identifier. Further, the captured images can be captured in a variety of sizes and resolutions.

In step 312, second client device 104b provides the images captured by second client device 104b to document organization system 102. Second client device 104b can transfer the images to document organization system 102 via a wire or wireless network using a variety of network protocols. For example, second client device 104b can post or push the captured images to document organization system 102. Second client device 104b can provide the images together or in separate transmissions.

Upon receiving the captured images, document organization system 102 determines feature vectors for the captured document image, as step 314 illustrates. In particular, document organization system 102 receives the captured document image and identifier image, analyzes the captured document image to determine feature vectors using the methods and processes described above, and stores the feature vectors for the captured document image. In an alternative embodiment, second client device 104b computes features of the captured image directly and sends the feature vectors to document organization system 102 rather than sending the captured document image. In this case, document organization system 102 skips step 314, as this step is performed by second client device 104b.

In some embodiments, document organization system 102 associates the captured document image with the identifier. For example, upon receiving the captured images, document organization system 102 recognizes the identifier as being linked to first client device 104a. Accordingly, by associating the captured document image with the identifier, document organization system 102 also associates the captured document image with first client device 104a and/or the user.

Step 316 shows document organization system 102 identifying a matching digital document or relevant digital documents. More specifically, document organization system 102 can compare the feature vectors of the captured document to the feature vectors for the accessed documents in a document collection to determine whether one or more of the accessed digital document matches the physical document. In particular, document organization system 102 can compare the similarity distance (e.g., L2 distance in Euclidean space, binary classification, boundary decisions, and/or support vector machine (SVM) score) between the feature vectors of the captured image and the feature vectors of a stored image to determine how close the images match.

For example, when using SVM, document organization system 102 can use feature vectors from the captured query image as a positive example and use feature vectors from random images as negative examples to train and classify document organization system 102. In this manner, document organization system 102 can quickly (e.g., less than 100 ms) use SVM to determine similarity distances between the captured document and the accessed documents in a document collection. If the images are perfect matches, the similarity distance will be zero or near zero. As images of stored digital documents diverge from the captured document image, the similarity distance between the corresponding feature vectors also increases.

In addition to identifying matches, document organization system 102 can identify near matches or otherwise relevant digital documents from the accessed documents. For instance, document organization system 102 can determine that any digital document that has a distance value to the captured image below a threshold distance value is a relevant document. For example, a user at a furniture store captures an image of a lamp, document organization system 102 can identify other similar images of lamps from the document collection, even if the lamps in the document collection are not exact matches. Alternatively, in some embodiments, document organization system 102 can determine that the top n results are relevant documents, ranked from lowest to highest similarity distances between feature vectors.

As a note, when determining matches, document organization system 102 can compare the captured image to each image connected to the accessed digital documents. For example, if a stored digital document is seven pages long and has seven document page images, each having its own set of feature vectors, document organization system 102 compares the feature vectors of the captured document image to the feature vectors of each document page image (or parsed portions within each document page image). In this manner, if the user provides the third or fourth page of a physical document as the captured document image, document organization system 102 can still find the matching digital document even though the matching page is not the first page of the digital document.

In some embodiments, document organization system 102 can compare one or more captured images from the same source (e.g., multiple pages from the same physical document, various images of an object, multiple frames from a video, etc.) to identify one or more accessed digital documents. For example, document organization system 102 can compare each captured image separately and total (and/or average) the aggregate results together to determine one or more relevant accessed digital documents. Alternatively, document organization system 102 can combine (e.g., average) feature vectors from each captured image together before identifying matching relevant documents from the access digital documents.

In step 318, document organization system 102 provides the digital document results to first client device 104a in association with the identifier. Because the identifier is associated with first client device 104a, document organization system 102 can send the results to first client device 104a. In this manner, if the user is using a client device belonging to a third-party, such as giving a presentation on a third-party client device at a hotel conference, document organization system 102 can provide the identifier to the third-party client device, the user can uses his or her mobile device to capture the identifier and an image of a physical document, and document organization system 102 can display the results on the third-party client device, without requiring the user to log in or otherwise provide personal information via the third-party client device.

In some embodiments, the user may provide instructions to send the results to a different target client device, such as second client device 104b, or another client device associated with the user. For example, the user may log on to first client device 104a and/or second client device 104b and a third client device. When sending in the captured images of the identifier and a physical document, the user may request to send the results to the third client device (i.e., request the third client device as the target client device). As such, document organization system 102 can associated the identifier with the user account and provide the results to the third client device.

Figure 4B:
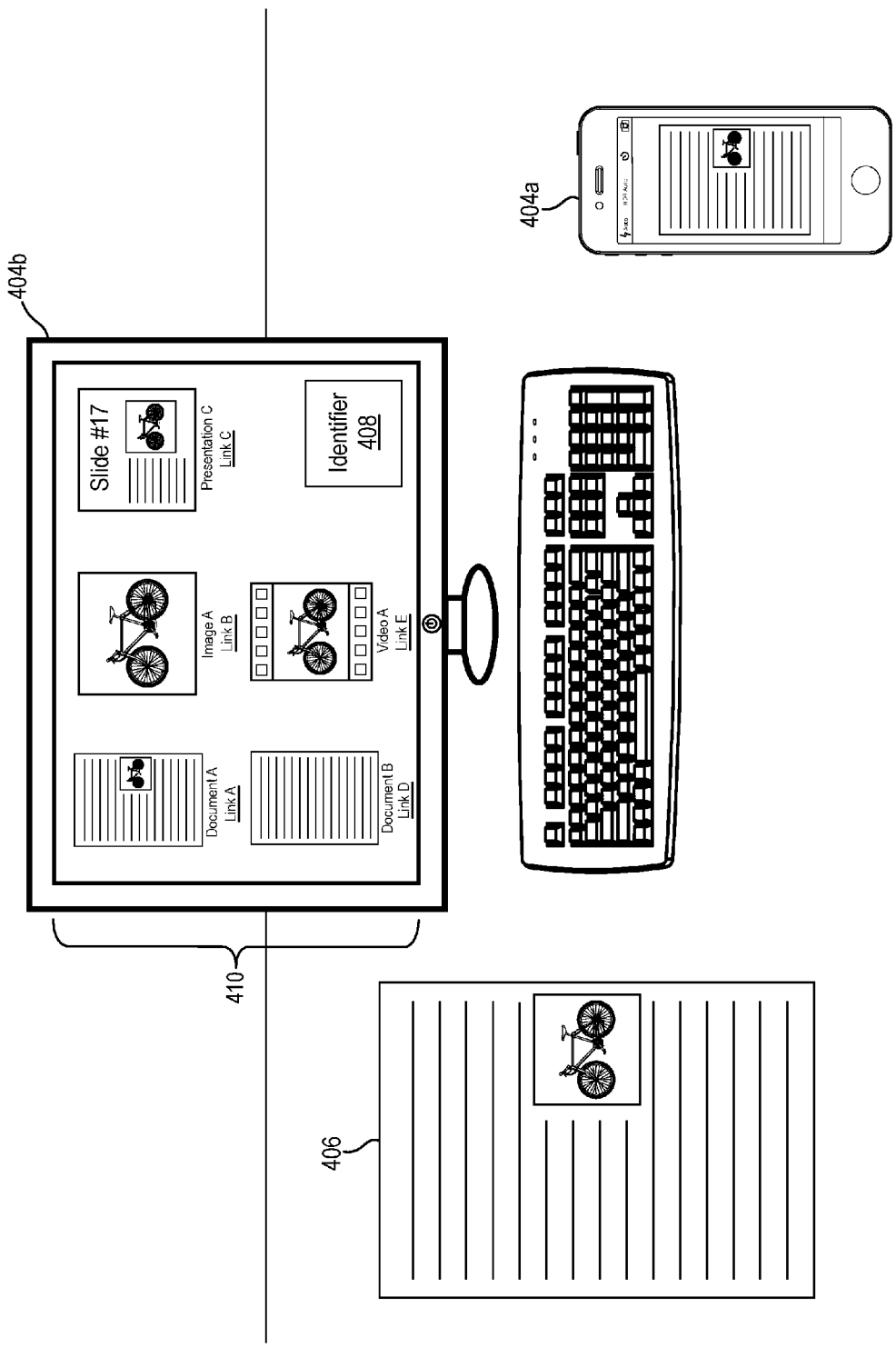

FIGS. 4A-4B illustrate an example workspace environment 400 (or simply "workspace 400") to illustrate features and processes disclosed herein. As shown in FIG. 4A, workspace 400 includes first client device 404a (e.g., a mobile phone device), second client device 404b (e.g., a desktop computing device), and physical document 406. First client device 404a and second client device 404b may be example embodiments of first client device 104a and second client device 104b described above. In some cases, workspace 400 represents a user's desk found at the user's workplace or home. One will appreciate that workspace 400 can represent physical workspaces at a variety of locations.

Second client device 404b in workspace 400 can display identifier 408. While identifier 408 is displayed in the bottom right corner of second client device 404b, the size, location, and/or position of identifier within second client device 404b can vary. Furthermore, the app within which identifier 408 is displayed can also vary. In some embodiments, second client device 404b displays identifier 408 within a digital workspace and/or user interface associated with a corresponding document management system or service. As mentioned above, identifier 408 can be a unique image, QR code, or another unique type of identifier that allows the document organization system to associate identifier with second client device 404b. As described below, in some embodiments, identifier 408 is hidden from the view of the user.

A user can operate first client device 404a and second client device 404b to obtain a digital document that matches physical document 406. For example, a user captures an image of physical document 406 with first client device 404a. The user also captures an image of identifier 408 with first client device 404a. Using first client device 404a, the user provides the captured images to a document organization system (e.g., document organization system 102). In response, the document organization system identifies matching and/or relevant digital documents and provides the digital documents to the user by way of second client device 404b.

To illustrate, FIG. 4B shows the second client device 404b displaying matching digital documents 410. In particular, matching digital documents displayed on second client device 404b include electronic documents (i.e., Document A and Document B), an image (i.e., Image A), a presentation (i.e., Presentation A), and a video (i.e., Video A). Each matching digital document 410 also includes a link to the digital document. In some embodiments, the image of the digital document itself may link to the digital document. For example, upon the user selecting the image of Document A, the document organization system may display Document A on second client device 404b. In various embodiments, the link may provide a description of the location of the corresponding document within a document collection.

As shown in second client device 404b of FIG. 4B, matching digital document 410 may include exact matches (e.g., Document A) and near matches (e.g., Document B and Presentation A). In addition, the document organization system can also provide other relevant or similar documents, such as other digital documents that show pictures of similar bicycles. For example, the document organization system can identify the image from within the physical document 406 and find digital documents that include the image (or near/relevant matches of the image) or the text of physical document. For instance, the document can match feature vectors from the image in physical document 406 to feature vectors in digital documents, such as matching the image of the bike in physical document 406 to images of the bike in Image A, Presentation A, and Video A (e.g., matched to a frame in Video A).

In some embodiments, rather than identifying second client device 404b based on identifier 408, document organization system can employ alternative methods to identify and link first client device 404a to second client device 404b (e.g., display results on second client device 404b). As one example, first client device 404a can use physical closeness (e.g., Bluetooth, NFC, IR, etc.) to trigger displaying results on second client device 404b. As another example, a user can manually select second client device 404b, for instance, from a device menu (e.g., a user selects "Conference Room Computer" from a device menu on first client device 404a or gives a voice command such as "show results on my tablet"). In this example, the selectable devices can be detected within the same network as first client device 404a, detected by first client device 404a, and/or associated with the user's account. As a further example, the document organization system may automatically display results on second client device 404b (e.g., first client device 404a is paired with second client device 404b and all results are automatically displayed on second client device 404b). As still another example, the user may "flick," "bump," "nudge," or otherwise link first client device 404a and 404b together.

Figure 5:
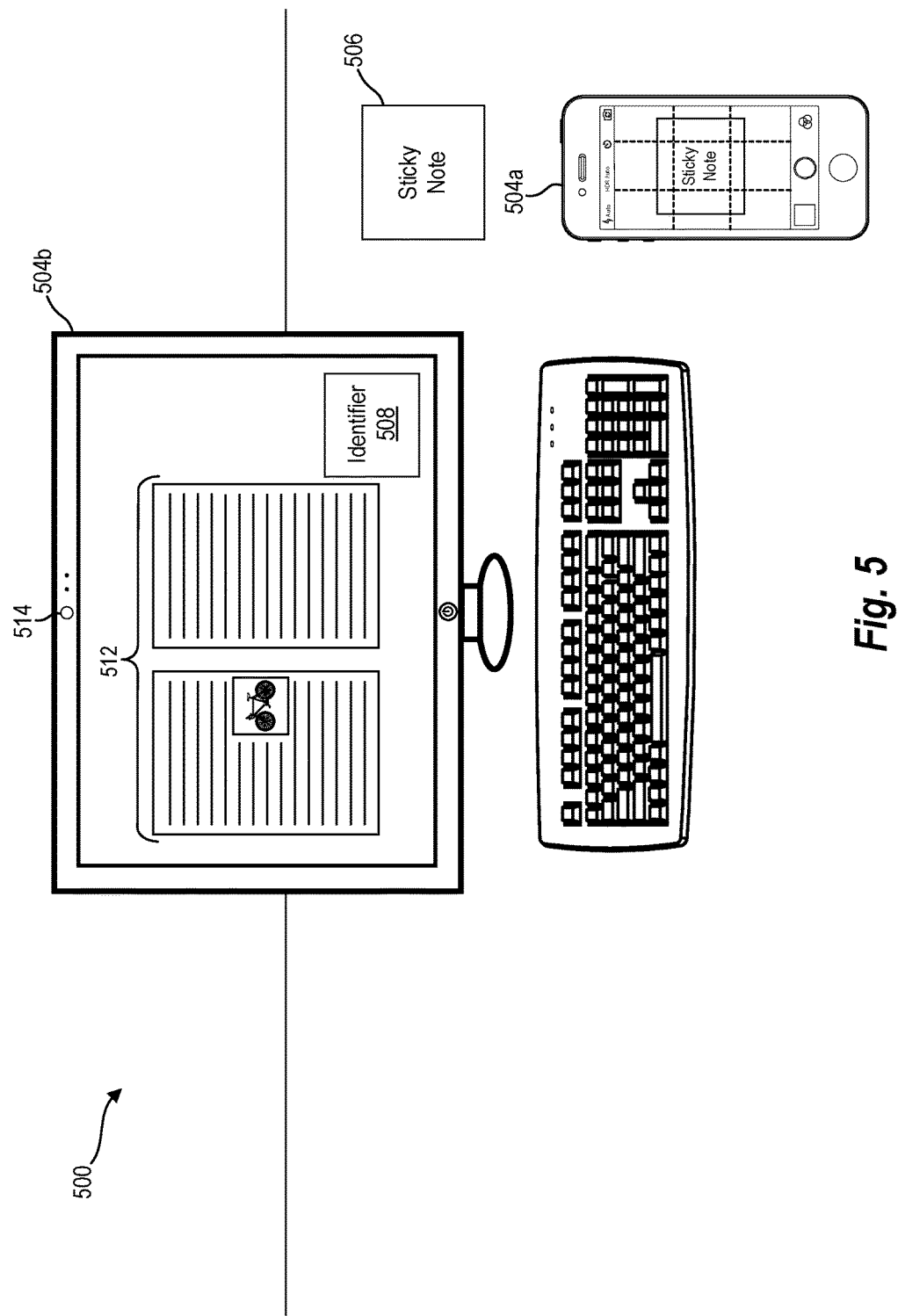
FIG. 5 illustrates another example workspace environment where document matching can occur in accordance with one or more embodiments described herein.

FIG. 5 illustrates another example workspace environment 500 (or simply "workspace 500") where document matching can occur in accordance with one or more embodiments. Workspace 500 includes many similar components, devices, and elements as workspace 400 described above. For example, workspace 500 includes first client device 504a and second client device 504b. In addition, workspace 500 includes a physical object, such as sticky note 506. Sticky note 506 can have writing on it that uniquely distinguishes it from other sticky notes that are blank, or that have different writing on them. In alternative configurations, the physical object is any other physical object (e.g., a mug, a pen, etc.).

Second client device 504a displays identifier 508. As described above, identifier 508 can assist the document organization system in identifying the client device, to which the document organization system will provide document results. In addition, second client device 504b also shows digital documents 512. A user may be using the digital documents 512 and have them arranged in a particular manner. For example, a user may open and purposely position the digital documents 512 within the display of second client device 504b.

With the digital documents 512 open, or otherwise selected, a user may bind digital documents 512 to a physical object. For example, the user can bind digital document 512 to sticky note 506. In particular, the user can use first client device 504a to send an image of sticky note 506 and identifier 508 to the document organization system. In connection with the captured image, the user can provide a request to bind digital documents 512 to sticky note 506. Using the identifier 508, the document organization system can identify digital documents 512 on second client device 504b and bind digital documents 512 to sticky note 506. Later, when the user wants to recall digital documents 512, the user need only provide an image of sticky note 506 to the document organization system.

To illustrate by way of example, while working on a first project involving digital documents 512, the user may need to switch to a different project involving different documents on second client device 504b. As such, the user binds digital documents 512 to sticky note 506 before closing digital documents 512 on second client device 504b and before opening documents related to the other project. For the sake of this example, image that sticky note 506 has the words "Project 1" written on it.

When the user wants to return to the first project and digital documents 512, the user provides an image of sticky note 506 to the document organization system. Specifically, the user provides an image of sticky note 506 with the words "Project 1" to the document organization system. In some instances, the user can provide an indication to recall a set of bound digital documents when providing the image of sticky note 506. In response, the document organization system recognizes the image of sticky note 506 including the words "Project 1," detects that digital documents 512 are bound to sticky note 506, identifies second client device 504b as the target destination for digital documents 512 based on identifier 508, and provides digital documents 512 to second client device 504a. To detect sticky note 506 and/or the words "Project 1" within the captured image provided by the user, the document organization system can use machine learning and neural networks as described above.

As an alternative example, the document organization system can retrieve multiple digital documents that are bound to multiple physical objects. For example, a user binds Document A to a first sticky note that reads "Project 1A" and binds Document B to a second sticky note that reads "Project 1B." Subsequently, the user later provides an image that includes both the first sticky note and the second sticky note. Upon receiving and analyzing the image, the document organization system detects both the first sticky note and the second sticky note within the image. Based on the detection, the document organization system locates and provides corresponding bound documents Document A and Document B to the user.

In some embodiments, in addition to binding one or more digital documents to a physical object, the document organization system can also bind the layout arrangement of the digital documents to the physical object. For example, as shown in FIG. 5, digital documents 512 are arranged in a particular layout. When the user binds digital documents 512 to sticky note 506, the document organization system can store the layout arrangement. Then, when the user provides sticky note 506 to the document organization system to recall digital documents 512, the document organization system can recall the layout arrangement of digital documents 512 and display digital documents 512 in the stored layout arrangement. Further, a user can bind different sets of digital documents to different physical objects. In this manner, the user can create a mental mapping of the physical objects, and the document organization system can quickly and conveniently provide corresponding digital documents upon the user's providing images of each physical object.

In a number of embodiments, the user may request to recall digital documents 512 to another client device. In providing the digital documents 512 to the other client device, the document organization system can determine if the other client device can display digital documents 512 in the stored layout arrangement, or if the document organization system should provide an alternative layout arrangement. For example, if the document organization system is providing digital documents 512 on a client device that has similar display properties as second client device 504*b* (or at least can accommodate the display requirements of the stored layout arrangement), the document organization system can display digital documents 512 as they are presented on second client device 504*b* in FIG. 5. If the document organization system is providing digital documents 512 to a client device that cannot accommodate the display requirements of the stored layout arrangement, such as a mobile client device, the document organization system can provide an alternative layout, such as stacking digital documents 512 or presenting the digital documents one at a time.

While the present disclosure generally describes using one client device to capture images of a physical object and another client device to display results, in one or more embodiments, a user can use a single client device to both capture images and display results. To illustrate, second client device 504*b* in FIG. 5 shows a camera 514. When binding digital documents 512 to sticky note 506, the user can use second client device 504*b* to capture an image of sticky note 506. Note, because the document organization system sends identifier 508 to second client device 504*b*, second client device 504*b* need to require the user to capture an image of identifier 508. Rather, second client device 504*b* can just send identifier 508 back to the document organization system along with an image of sticky note 506. In these and other cases, identifier 508 can be hidden from the user's view.

Further, in some embodiments, camera 514 on second client device 504*b* captures live image scans rather than snapping and storing a picture. For example, a user provides a command to second client device 504*b*, such as a voice command or a selection of a virtual button, to bind digital documents 512 to sticky note 506. Upon receiving the command, second client device 504*b* activates camera 514, which sends a live image feed of sticky note 506 to the document organization system. In various embodiments, the user can also provide voice commands to identify document matches of digital documents from a physical document.

In additional embodiments, the document organization system can also identify a user providing a physical gesture, such as pointing, to identify a physical document or physical object, such as sticky note 506. Based on the gesture along with a user command (such as a voice command to bind), the document organization system can bind digital document 512 to sticky note 506. Alternatively, in some embodiments, rather that the document organization system, second client device 504*b* analyzes the live image feed, detects the gesture indicating sticky note 506, and provides an image of sticky note 506 to the document organization system.

Likewise, when the user wants to recall digital documents 512, the user provides a command to activate a live image feed on camera 514. Again, second client device 504*b* scans the live image feed and provides the feed to the document organization system, which detects the user pointing to sticky note 506. Upon detecting the user pointing to sticky note 506, the document organization system can determine that digital documents 512 are bound to sticky note 506. Further, the document organization system can provide digital documents 512 to the user to second client device 504*b*. In this manner, the user can quickly bind and recall one or more digital documents with a single client device and/or using physical gestures, such as pointing to physical objects.

In additional embodiments, the document organization system can detect manipulation of a physical object and apply a modification to a corresponding digital document. For example, the document organization system can detect that a user has highlighted portions of a physical document. As such, the document organization system can add highlighting or similar coloring to the corresponding digital document. As another example, the document organization system detects when a user rotates or folds a physical object. In response, the document organization system can change a property or attribute of a digital document, such as change the contrast, apply cropping, etc.

In various embodiments, a user can beam digital documents and/or results to other client devices. For example, a user may obtain one or more matching digital documents on a mobile client device. The use may use Bluetooth, NFC, Wi-Fi, or another technology to beam the digital documents to another client device. In some embodiments, a user can share an identifier with multiple client devices. Then, when the document organization system provides a matching digital document, the document organization system can provide the matching digital documents to multiple client devices that have the identifier at the same time.

Figure 6:
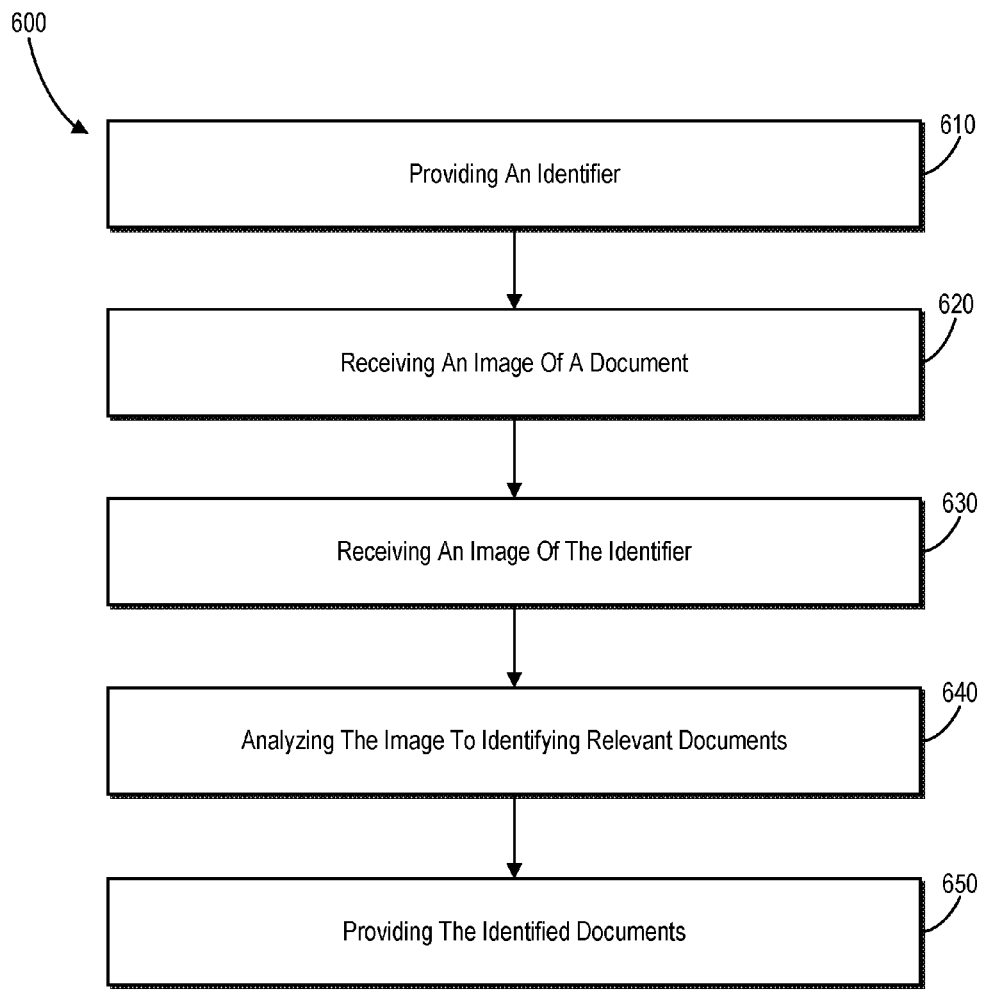
FIG. 6 illustrates a flowchart of a series of acts in a method for providing relevant digital documents based on a physical object in accordance with one or more embodiments.
Figure 7:
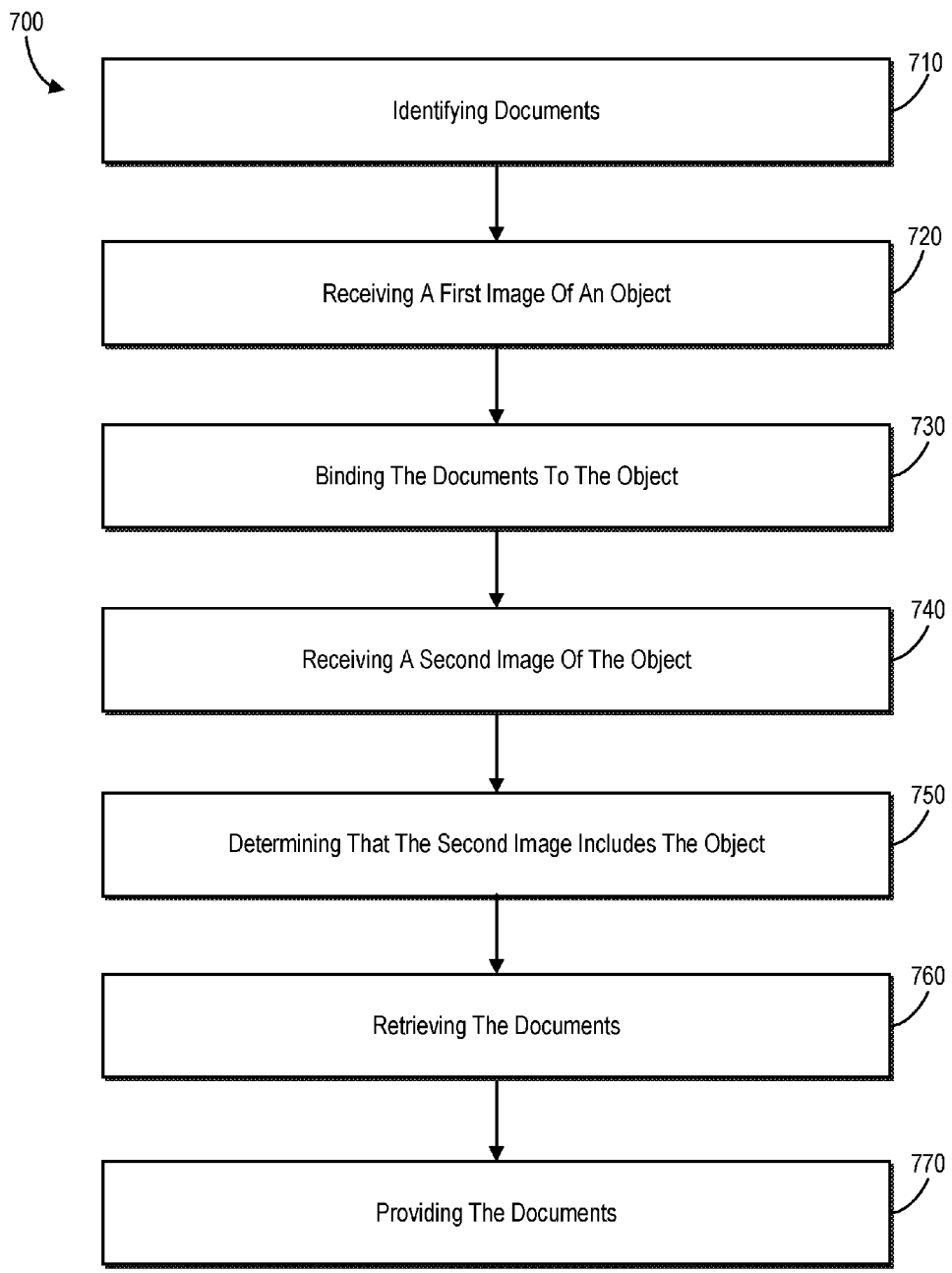
FIG. 7 illustrates a flowchart of a series of acts in a method for binding digital documents to a physical object in accordance with one or more embodiments.

FIGS. 1-5, the corresponding text, and the examples, provide a number of different systems and devices for providing relevant digital documents based on a physical object. In addition to the foregoing, one or more embodiments can also be described in terms of flowcharts comprising acts and steps in a method for accomplishing a particular result. For example, FIGS. 6 and 7 illustrate flowcharts of exemplary methods in accordance with one or more embodiments. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts. Furthermore, the thumbnail caching system can perform each of the acts described in relation to FIGS. 6 and 7 automatically without user input.

FIG. 6 illustrates a flowchart of an example method 600 for providing relevant digital documents based on a physical object. While FIG. 6 illustrates example steps according to one embodiment, other embodiments may omit, add to, reorder, and/or modify any of the steps shown in FIG. 6. One or more steps shown in FIG. 6 may be performed by any of the components illustrated in document organization system 102 illustrated in FIG. 2. Further, one or more steps of method 600 may be performed by client device 104*a*, client device 104*b*, client device 404*a*, client device 404*b*, client device 504*a*, client device 504*b*, server device 101, or a combination of both a client device and a server device.

Method 600 includes act 610 of providing an identifier. In particular, act 610 may involve providing a unique identifier 408 for display at first client device 404*a*. For example, act 610 may include creating a unique identifier. In some embodiments, the identifier is an image, a QR code, or a sequence of numbers and/or letters. The identifier can uniquely identify a user and/or a client device.

Method 600 further includes act 620 of receiving an image of a document. In particular, act 620 may involve receiving, from a second client device 404*b*, an image of a physical document captured by a user. For example, act 620 may include receiving an image of a physical object, such as a physical document. In one or more embodiments, the second client device is a mobile client device with image capturing capabilities.

In addition, method 600 includes act 630 of receiving an image of the identifier. In particular, act 630 may involve receiving, from the second client device 404*a*, an image of the identifier 408 captured by the user. For instance, act 630 may include the second client device capturing an image of the identifier displayed on the first client device and providing the image of the identifier.

Method 600 also includes act 640 of analyzing the image to identify relevant documents. In particular, act 640 may involve analyzing the image of the physical document to identify one or more digital documents that are relevant to the physical document. In addition, step 640 may include accessing a document collection housing the digital documents, where the digital documents each have one or more document pages, and for each document page, determining one or more feature vectors for each of the one or more document pages. For example, step 6340 may involve accessing digital documents uploaded by a user to document collection, uploaded by the user's organization (e.g., provided by co-workers, colleagues, etc.), uploaded by other users, and/or made available via the Internet (e.g., state or federal tax forms, public images, etc.).

Further, step 640 may involve determining one or more feature vectors for image of the physical document, and comparing the one or more feature vectors of the image of the physical document to the one or more feature vectors of each of the one or more document pages of the plurality documents in the document collection. In some embodiments, a document is classified as relevant when the feature vectors of a document page image of the document has a similarity distance below a threshold distance to the feature vectors of the document image. In various embodiments, the document collection comprises text files, image files, and video files.

Method 600 further includes act 650 of providing the relevant documents. In particular, act 650 may involve providing, based on the received image of the identifier 408, the one or more digital documents to the first client device 404*a*. For example, act 650 may include providing the identified documents to the client device based on determining that the identifier is located on the first client device.

Further, in one or more embodiments, method 600 may include one or more additional acts to create and maintain a thumbnail cache. For example, method 600 may include an act of receiving, from the first client device, a selected document from the relevant documents and providing, to the first client device, the selected relevant document. In some embodiments, method 600 may also include an act of receiving, from the first client device, instructions to send the selected relevant document to the second client device.

FIG. 7 illustrates a flowchart of an example method 700 for binding digital documents to a physical object. While FIG. 7 illustrates example steps according to one embodiment, other embodiments may omit, add to, reorder, and/or modify any of the steps shown in FIG. 7. One or more steps shown in FIG. 7 may be performed by any of the components illustrated in document organization system 102 illustrated in FIG. 2. Further, one or more steps of method 600 may be performed by client device 104*a*, client device 104*b*, client device 404*a*, client device 404*b*, client device 504*a*, client device 504*b*, server device 101, or a combination of both a client device and a server device.

Method 700 includes act 710 of identifying documents. In particular, act 710 may involve identifying one or more digital documents. For example, act 710 may include receiving an image of the one or more documents from a client device and identifying one or more documents from the document collection matching the one or more received images. As another example, act 710 may include receiving a selection of the one or more documents from a client device.

Method 700 further includes act 720 of receiving a first image of an object. In particular, act 720 may involve receiving a first image of a physical object captured by a user. In some cases, act 720 may involve receiving, from a client device, a first image of a physical object. In one or more embodiments, the client device has image capturing capabilities. In some embodiments, the physical object is a physical paper document or three-dimensional object.

Method 700 additionally includes act 730 of binding the documents to the object. In particular, act 730 may involve binding the one or more digital documents to the physical object. For instance, act 730 may include binding the one or more digital documents to a particular client device, where the one or more digital documents bound to the first image of the object are provided to the particular client device. In another instance, act 730 may include binding the one or more digital documents to a particular arrangement on a client device, where providing the one or more digital documents bound to the first image of the object includes providing the one or more digital documents to the client device in the particular arrangement. In addition, act 730 may include binding multiple documents to the first image based on detecting multiple physical objects within the first image. Further, in some embodiments, act 730 may include receiving a voice command to bind the one or more digital documents to the received first image of the object.

Method 700 further includes act 740 of receiving a second image of the object. In particular, act 740 may involve receiving a second image of the physical object captured by the user. In some cases, act 740 may involve receiving, from a client device, a second image of the physical object. In one or more embodiments, the client device has image capturing capabilities.

Method 700 also includes act 750 of determining that the second image includes the object. In particular, act 750 may involve determining that the second image includes the physical object. For example, act 750 may include determining that the second image includes the physical object by determining that the similarity distance between the feature vectors from the first image of the object and the feature vectors from the second image of the object are below a threshold distance value. In some embodiments, method 700 includes an act of using a deep neural network machine learning to determine feature vectors for the first image of the object and the second image of the object.

In addition, method 700 also includes act 760 of retrieving the documents. In particular, act 760 may involve retrieving the one or more digital documents in response to receiving the second image. For example, act 760 may include retrieving digital documents that have a similarity distance between the feature vectors from the first image of the object and the feature vectors from the second image of the object that are below the threshold distance value.

Method 700 further includes act 770 of providing the documents. In particular, act 770 may involve based on determining that the second image includes the physical object and based on the binding of the one or more digital documents to the physical object, the one or more digital documents to the user. For example, act 760 may include providing the documents that are bound to the object to a user via a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
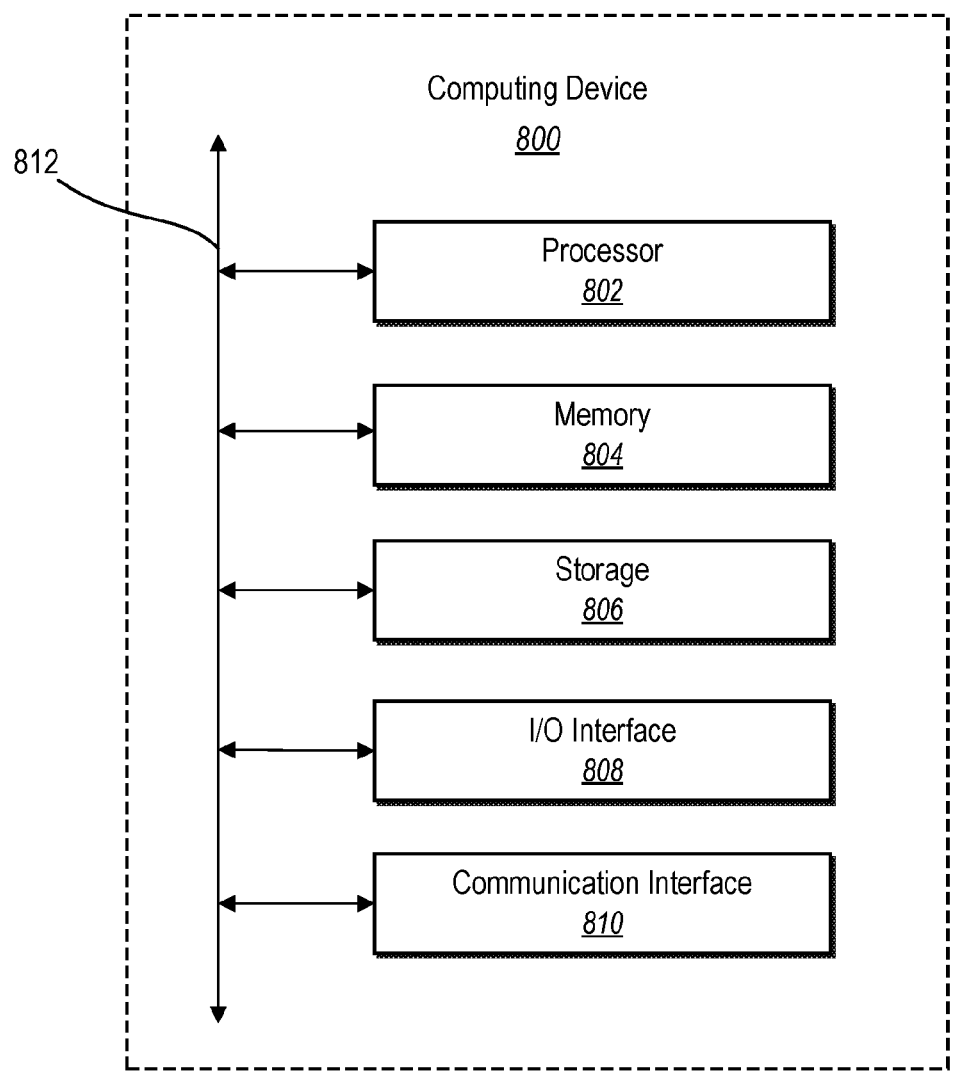
FIG. 8 illustrates a block diagram of a computing device in accordance with one or more embodiments.

FIG. 8 illustrates a block diagram of exemplary computing device 800 that may be configured to perform one or more of the processes described above. One will appreciate that computing device 800 may represent client devices (e.g., client device 104a, client device 104b, client device 404a, client device 404b, client device 405a, 4 client device 405b) and/or service device 101. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
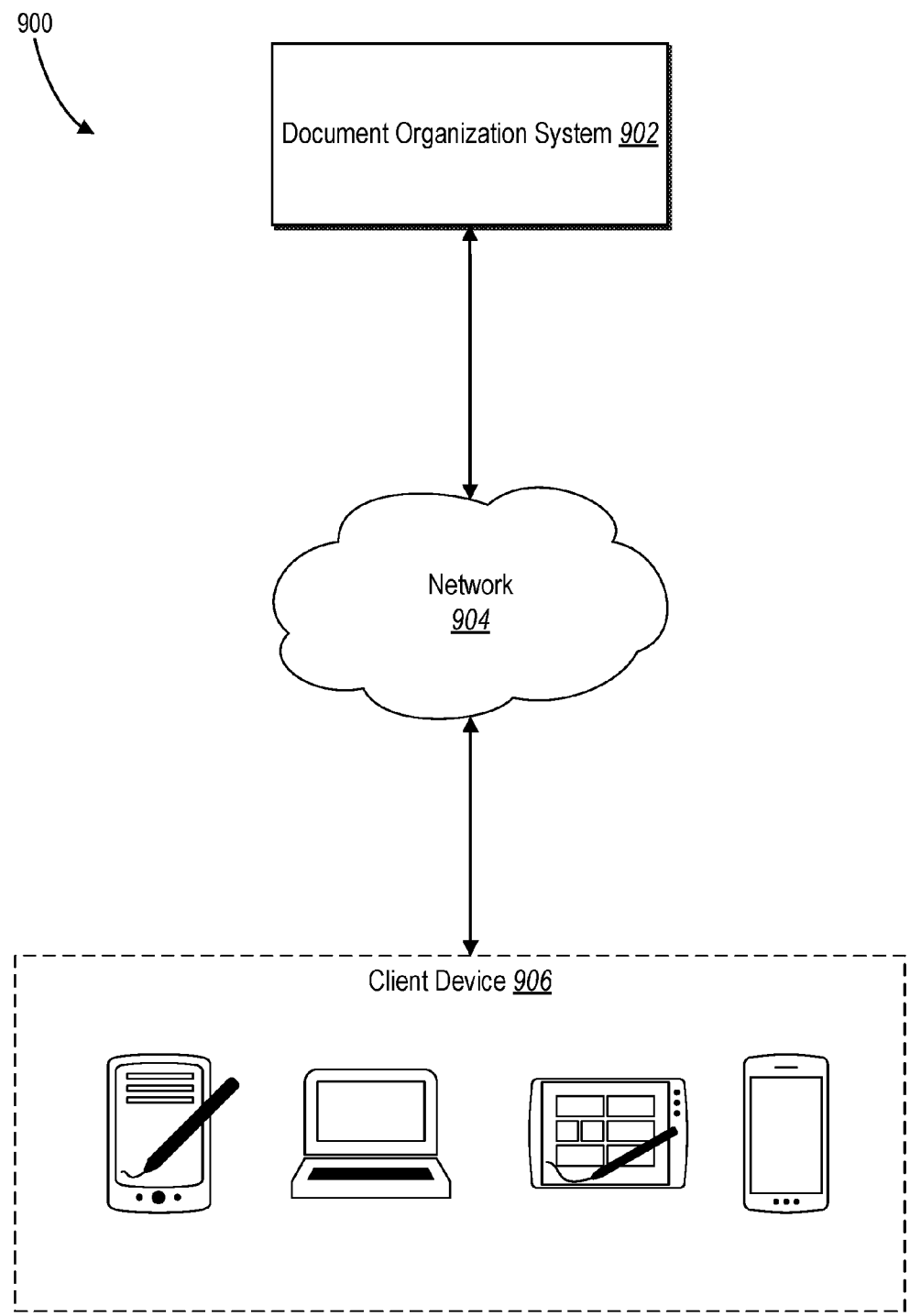
FIG. 9 illustrates a networking environment of a document organization system in accordance with one or more embodiments.

FIG. 9 is a schematic diagram illustrating an environment 900 within which one or more embodiments of document organization system 902 can be implemented. Document organization system 902 may generate, store, manage, receive, and send digital content associated with digital documents. For example, document organization system 902 may send and receive digital documents to and from client devices 906 by way of network 904.

In particular, document organization system 902 can manage synchronizing digital documents across multiple client devices 906 associated with one or more users. For example, a user may capture a physical document and/or physical object using client device 906. The document organization system 902 can cause client device 906 to send the captured images to document organization system 902. Document organization system 902 can then identify matching and/or relevant digital documents on one or more additional computing devices.

Client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access document organization system 902.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
providing, by at least one processor of a server, a unique identifier for display at a first client device;
receiving, from a second client device, an image of a physical document captured by a user;
receiving, from the second client device, an image of the identifier captured by the user;
generating, by the at least one processor of the server, feature vectors for the image of the captured physical document;
comparing, by the at least one processor of the server, the generated feature vectors for the image of the physical document to feature vectors of images of digital documents associated with an account of the user to identify one or more digital documents associated with the account of the user that are relevant to the physical document; and
providing, based on the received image of the identifier, the one or more digital documents associated with the account of the user that are relevant to the physical document to the first client device.

2. The method of claim 1, further comprising:
accessing a document collection associated with the account of the user including a plurality of the documents each having one or more document pages; and
for each document in the document collection associated with the account of the user, determining one or more feature vectors for each of the one or more document pages; and
wherein identifying the one or more digital documents associated with the account of the user that are relevant to the physical document comprises comparing the generated feature vectors for the image of the physical document to the one or more feature vectors of each of the one or more document pages of the plurality documents in the document collection associated with the account of the user.

3. The method of claim 2, further comprising using a deep neural network machine learning process to determine the feature vectors for the image of the physical document.

4. The method of claim 3, further comprising identifying a digital document of the one or more digital documents as relevant to the physical document when the feature vectors of a document page image of the digital document have a Euclidian similarity distance below a threshold similarity distance to the feature vectors of the document image.

5. The method of claim 3, wherein the deep neural network machine learning process ends one or more iterations before completion to obtain the feature vectors for the image of the captured physical document.

6. The method of claim 1, wherein the digital documents associated with an account of the user comprises text files, image files, and video files.

7. The method of claim 1, wherein the document image is a live scan of the document image provided to the server in real-time, and wherein the document image is not stored on the second client device.

8. The method of claim 1, further comprising:
receiving, from the first client device, a selection of a document associated with the account of the user from the one or more digital documents associated with the account of the user that are relevant to the physical document; and providing, to the first client device, the selected document associated with the account of the user.

9. The method of claim 8, further comprising receiving, from the first client device, instructions to send a copy of the selected document associated with the account of the user to the second client device.

10. The method of claim 1, further comprising identifying an object in the image of the captured physical document, and wherein:
generating the feature vectors for the image of the captured physical document comprises generating the feature vectors of the identified object; and
the one or more digital documents associated with the account of the user that are relevant to the physical document each comprise the identified object.

11. The method of claim 1, wherein the image of the captured physical document comprises an image of a non-first page of a multi-page document.

12. The method of claim 1, wherein the feature vectors for the image of the captured physical document correspond high-level features that capture metadata about an image.

13. A system comprising:
at least one processor; and
at least one non-transitory computer readable storage medium storing instructions that, when executed by the at least one processor, cause the system to:
provide a unique identifier for display at a first client device;
receive, from a second client device, an image of a physical document captured by a user;
receive, from the second client device, an image of the identifier captured by the user;
generate, by the at least one processor, feature vectors for the image of the captured physical document;
compare the generated feature vectors for the image of the physical document to feature vectors of images of digital documents associated with an account of the user to identify one or more digital documents associated with the account of the user that are relevant to the physical document; and
provide, based on the received image of the identifier, the one or more digital documents associated with the account of the user that are relevant to the physical document to the first client device.

14. The system of claim 13, further comprising instructions that, when executed by the at least one processor, cause the system to:
access a document collection associated with the account of the user including a plurality of the documents each having one or more document pages; and
determine, for each document in the document collection associated with the account of the user, one or more feature vectors for each of the one or more document pages; and
wherein identifying the one or more digital documents associated with the account of the user that are relevant to the physical document comprises comparing the generated feature vectors for the image of the physical document to the one or more feature vectors of each of the one or more document pages of the plurality documents in the document collection associated with the account of the user.

15. The system of claim 14, further comprising instructions that, when executed by the at least one processor, cause the system to use a deep neural network machine learning process to determine the feature vectors for the image of the physical document.

16. The system of claim 15, further comprising instructions that, when executed by the at least one processor, cause the system to identify a digital document of the one or more digital documents as relevant to the physical document when the feature vectors of a document page image of the digital document have a Euclidian similarity distance below a threshold similarity distance to the feature vectors of the document image.

17. The system of claim 15, wherein the deep neural network machine learning process ends one or more iterations before completion to obtain the feature vectors for the image of the captured physical document.

18. A non-transitory computer-readable medium storing instructions that, when executed by at least one processor, cause a computer system to:
provide a unique identifier for display at a first client device;
receive, from a second client device, an image of a physical document captured by a user;
receive, from the second client device, an image of the identifier captured by the user;
generate, by the at least one processor, feature vectors for the image of the captured physical document;
compare the generated feature vectors for the image of the physical document to feature vectors of images of digital documents associated with an account of the user to identify one or more digital documents associated with the account of the user that are relevant to the physical document; and
provide, based on the received image of the identifier, the one or more digital documents associated with the account of the user that are relevant to the physical document to the first client device.

19. The non-transitory computer-readable medium of claim 18, further comprising instructions that, when executed by the at least one processor, cause the computer system to identify an object in the image of the captured physical document, and wherein:
generating the feature vectors for the image of the captured physical document comprises generating the feature vectors of the identified object; and
the one or more digital documents associated with the account of the user that are relevant to the physical document each comprise the identified object.

20. The non-transitory computer-readable medium of claim 18, wherein the feature vectors for the image of the captured physical document correspond high-level features that capture metadata about an image.

* * * * *